US010683223B1

(12) United States Patent
Wegner

(10) Patent No.: US 10,683,223 B1
(45) Date of Patent: Jun. 16, 2020

(54) PROCESS TO REMOVE TRANSITION METALS FROM WASTE WATER

(71) Applicant: Paul C. Wegner, San Carlos, CA (US)

(72) Inventor: Paul C. Wegner, San Carlos, CA (US)

( * ) Notice: Subject to any disclaimer, the term of this patent is extended or adjusted under 35 U.S.C. 154(b) by 317 days.

(21) Appl. No.: 15/473,003

(22) Filed: Mar. 29, 2017

Related U.S. Application Data

(60) Provisional application No. 62/390,484, filed on Apr. 1, 2016.

(51) Int. Cl.
C02F 9/00 (2006.01)
B01D 61/58 (2006.01)
(Continued)

(52) U.S. Cl.
CPC .............. C02F 9/00 (2013.01); B01D 1/0011 (2013.01); B01D 5/0027 (2013.01); B01D 61/58 (2013.01); B01D 2311/18 (2013.01); B01D 2311/2623 (2013.01); B01D 2311/2638 (2013.01); B01D 2311/2649 (2013.01);
(Continued)

(58) Field of Classification Search
CPC ...... C02F 1/66; C02F 1/42; C02F 1/70; C02F 1/705; C02F 1/44; C02F 1/442; C02F 1/444; C02F 2001/422; C02F 2001/425; C02F 2001/427; C02F 2101/20; C02F 2101/203; C02F 2101/206; C02F 2101/22; C02F 2101/10; C02F 9/00
See application file for complete search history.

(56) References Cited

U.S. PATENT DOCUMENTS 3,985,648 A * 10/1976 Casolo .................... B01J 39/04
210/669
4,321,145 A * 3/1982 Carlson ................. C25D 21/22
210/177
(Continued)

OTHER PUBLICATIONS

DeSilva, Frank. Protecting ion exchange resins from suspended solids. Water Quality Products. Mar. 24, 2011. Available at <https://www.wqpmag.com/protecting-ion-exchange-resins-suspended-solids>, 2 pages. (Year: 2011).*
(Continued)

Primary Examiner — Katherine Zalasky McDonald
(74) Attorney, Agent, or Firm — Head, Johnson, Kachigian & Wilkinson, PC

(57) ABSTRACT

A process to remove transition metals from waste water. The process includes the steps of passing waste water to a first pH resin bed, monitoring the effluent from the first resin bed, and adjusting pH to greater than 4. The effluent is passed to a first stage liquid tank and to a first brackish water membrane to filter out complex metals. Rejected effluent from the first brackish water membrane is passed to a second stage liquid tank and thereafter to a second brackish water membrane. The permeate from the second brackish water membrane is passed back to the first stage liquid tank. The rejected effluent from the second brackish water membrane is heated and evaporated. The evaporated effluent is condensed so that metal crystals are gathered for disposal. The permeate through the first brackish membrane is passed to an EDTA resin bed to sequester metal ions. The pH of the discharge from the second pH resin bed is adjusted to between 7 and 11.

5 Claims, 3 Drawing Sheets

(51) Int. Cl.
| | |
|---|---|
| *C02F 1/00* | (2006.01) |
| *C02F 1/44* | (2006.01) |
| *C02F 1/66* | (2006.01) |
| *C02F 1/70* | (2006.01) |
| *C02F 101/12* | (2006.01) |
| *C02F 1/68* | (2006.01) |
| *C02F 1/42* | (2006.01) |
| *C02F 101/20* | (2006.01) |
| *B01D 1/00* | (2006.01) |
| *B01D 5/00* | (2006.01) |
| *C02F 1/04* | (2006.01) |
| *C02F 101/18* | (2006.01) |

(52) U.S. Cl.
CPC ...... *B01D 2311/2673* (2013.01); *C02F 1/001* (2013.01); *C02F 1/048* (2013.01); *C02F 1/42* (2013.01); *C02F 1/44* (2013.01); *C02F 1/66* (2013.01); *C02F 1/685* (2013.01); *C02F 1/70* (2013.01); *C02F 2101/12* (2013.01); *C02F 2101/18* (2013.01); *C02F 2101/20* (2013.01); *C02F 2209/06* (2013.01); *C02F 2301/08* (2013.01)

(56) References Cited

U.S. PATENT DOCUMENTS

| | | | | |
|---|---|---|---|---|
| 4,806,244 A | * | 2/1989 | Guilhem | B01D 61/025 210/638 |
| 5,055,201 A | | 10/1991 | Wegner | |
| 5,078,900 A | | 1/1992 | Wegner | |
| 5,095,926 A | | 3/1992 | Wegner | |
| 5,328,616 A | * | 7/1994 | Martyak | B01D 61/025 210/259 |
| 5,348,588 A | * | 9/1994 | Winston | C02F 1/5236 134/10 |
| 5,811,012 A | * | 9/1998 | Tanabe | C02F 1/42 210/669 |
| 5,814,224 A | * | 9/1998 | Khamizov | B01J 39/02 210/638 |
| 5,925,255 A | * | 7/1999 | Mukhopadhyay | B01D 61/022 210/638 |
| 5,997,745 A | * | 12/1999 | Tonelli | B01D 61/022 210/180 |
| 5,998,640 A | | 12/1999 | Haefele et al. | |
| 6,054,050 A | * | 4/2000 | Dyke | B01D 61/04 210/639 |
| 6,071,413 A | * | 6/2000 | Dyke | B01D 61/025 210/651 |
| 6,103,092 A | * | 8/2000 | Silva | C01D 3/145 205/536 |
| 6,113,797 A | * | 9/2000 | Al-Samadi | B01D 61/022 210/650 |
| 6,203,705 B1 | * | 3/2001 | James | B01D 61/142 210/638 |
| 6,247,480 B1 | | 6/2001 | Wegner | |
| 6,267,891 B1 | * | 7/2001 | Tonelli | B01D 61/022 210/638 |
| 6,346,195 B1 | * | 2/2002 | Filson | C02F 1/283 210/668 |
| 6,398,964 B1 | * | 6/2002 | Brady | C02F 1/444 204/194 |
| 6,537,456 B2 | * | 3/2003 | Mukhopadhyay | B01D 61/022 210/638 |
| 6,613,230 B2 | * | 9/2003 | Krulik | C02F 1/5245 210/638 |
| 7,108,792 B2 | | 9/2006 | Wegner | |
| 7,399,366 B1 | | 7/2008 | Wegner et al. | |
| 7,413,084 B2 | | 8/2008 | Wegner | |
| 7,438,129 B2 | * | 10/2008 | Heins | C02F 1/04 166/266 |
| 7,562,664 B2 | | 7/2009 | Wegner et al. | |
| 8,226,820 B1 | | 7/2012 | Wegner | |
| 8,986,503 B2 | * | 3/2015 | Kemp | C02F 1/24 162/190 |
| 9,670,075 B1 | | 6/2017 | Wegner | |
| 9,719,179 B2 | * | 8/2017 | Marcin | C25B 15/00 |
| 9,969,638 B2 | * | 5/2018 | Govindan | C02F 9/00 |
| 2001/0004962 A1 | * | 6/2001 | Hirota | C02F 1/46104 204/228.1 |
| 2002/0056690 A1 | | 5/2002 | Wegner | |
| 2002/0102229 A1 | | 8/2002 | Wegner | |
| 2002/0153319 A1 | * | 10/2002 | Mukhopadhyay | B01D 61/022 210/652 |
| 2003/0151024 A1 | | 8/2003 | Wegner | |
| 2004/0050786 A1 | * | 3/2004 | Dey | B01D 19/0031 210/640 |
| 2004/0142834 A1 | | 7/2004 | Wegner | |
| 2005/0065052 A1 | | 3/2005 | Wegner | |
| 2005/0142096 A1 | | 6/2005 | Wegner | |
| 2005/0189301 A1 | | 9/2005 | Wegner et al. | |
| 2005/0194319 A1 | | 9/2005 | Wegner | |
| 2005/0263740 A1 | | 12/2005 | Wegner | |
| 2006/0081503 A1 | | 4/2006 | Wegner | |
| 2007/0102359 A1 | * | 5/2007 | Lombardi | B01D 17/085 210/639 |
| 2008/0060978 A1 | | 3/2008 | Wegner | |
| 2008/0272037 A1 | | 11/2008 | Wegner et al. | |
| 2008/0296232 A1 | | 12/2008 | Wegner | |
| 2010/0163489 A1 | * | 7/2010 | Bauder | C02F 9/00 210/652 |
| 2010/0320155 A1 | * | 12/2010 | Enos | C02F 1/5236 210/717 |
| 2011/0000860 A1 | * | 1/2011 | Bland | C01B 11/024 210/748.2 |
| 2014/0069821 A1 | * | 3/2014 | Marcin | C25B 15/00 205/498 |

OTHER PUBLICATIONS

Miller et al. Understanding ion-exchange resins for water treatment systems. General Electric Company. Jun. 2009, 13 pages. (Year: 2009).*

EPA, "Standard operating procedure for calibration and maintenance of pH meters," SOP No. EQ-01-07, Nov. 25, 2014, 10 pages. (Year: 2014).*

* cited by examiner

PROCESS TO REMOVE TRANSITION METALS FROM WASTE WATER

CROSS-REFERENCE TO RELATED APPLICATIONS

This application claims priority to and the benefit of U.S. Provisional Patent Application Ser. No. 62/390,484, filed Apr. 1, 2016, entitled "Transition Metal Removal from Waste Water", which is herein incorporated in its entirety by reference.

BACKGROUND OF THE INVENTION

1. Field of the Invention

The present invention is directed to a process to remove transition and earth metals from industrial discharge waste water. In particular, the present invention is directed to a process to remove transition and earth metals from waste water utilizing a multi-stage system of resin beds for neutralization and for pH control and membranes for removing metal complexes.

2. Description of the Related Art

The use of chelation agent chemicals to keep transition metals soluble for a broad pH range is common in the plating, polishing and cleaning of metals. Industrial waste may contain a complex mixture of chemicals, such as sulfate, nitrate, phosphate, chloride, sodium, ammonia, and a host of chelating agents, such as citrate, phosphate, and ethylenediamine tetra-acetic acid (EDTA). The treatment of the resulting industrial liquid waste stream is very difficult. The raw industrial effluent can vary from pH 0 to pH 14, making pH control difficult.

The transition metals are difficult to remove from waste water streams in the presence of chelation chemicals, such as ethylenediamine tetra-acetic acid (EDTA) and cyanide. EDTA is used as a chelating agent to sequester metal ions. Since chelation chemicals keep the metals in solution, precipitation and flocking methods are not normally effective. Precipitation in metals requires large amounts of chemicals, generates large amounts of hazardous sludge, and requires complex filtration equipment which is labor intensive.

It is desirable to maintain the discharge to a pH of between 6 to 10. Controlling discharge pH close to 7 is quite difficult and governmental and regulatory penalties are high for discharge with pH outside of the required range.

The pH of the industrial waste streams can vary over a broad range.

As shown in the prior art diagram in FIG. 1, traditionally, pH is controlled with a three-stage system consisting of a mixing tank and a pH meter with acid and base dosing pumps for each of the three sequential stages. A feed rate of 100 gpm is shown with three separate three-thousand gallon tanks. The residence time in each tank is lengthy and it is difficult to maintain tight pH control with this system.

In order to accommodate this situation, many maintain a pH of between 8 to 9 to prevent possible movement below a neutral pH. This requires an excess of alkaline chemicals which can increase the total disposable solids in the remaining effluent. These prior art systems have a large footprint, are energy intensive, and require complex controls.

Accordingly, it would be desirable to provide a process to remove transition and earth metals from industrial discharge waste water that is simple and easily controlled and regulated.

In addition to the foregoing, in some industrial waste water treatments, exhaust gases are released to the atmosphere. Increasingly, laws and regulations prohibit release of toxic emissions.

It is further desirable to provide a process to remove transition and earth metals with a closed loop system that has no atmospheric emissions.

SUMMARY OF THE INVENTION

The present invention is directed to a process to remove transition metals from waste water. Industrial waste water is passed to a first pH resin bed. The effluent exiting the first pH resin bed is monitored and the pH is adjusted to a pH greater than 4. Selected weak acid or strong acid may be introduced to the resin bed to retain the effluent at a pH greater than 4. Metal ions may be released selectively by gradually reducing the pH. The effluent from the first pH resin bed is passed to a first stage liquid tank. The effluent from the first stage liquid tank is passed to a first brackish water membrane to filter out complex metals. A source of ethylenediamine tetra-acetic acid (EDTA) may be introduced into the stream in advance of the first brackish water membrane.

Rejected effluent from the first brackish water membrane is passed to a second stage liquid tank and thereafter to a second brackish water membrane. Permeate from the second brackish water membrane is passed back to the first stage liquid tank. Rejected effluent from the second brackish water membrane is passed to a third stage liquid tank and thereafter to a seawater membrane.

Permeate through the seawater membrane is passed back to the second stage liquid tank. Rejected effluent from the seawater membrane is passed to an evaporation system. The effluent is heated and directed to an evaporator vessel. Crystals, such as crystals containing metal, are gathered for disposal in a decanting tank.

The permeate through the first brackish water membrane is passed to an EDTA resin bed in order to sequester remaining metal ions. Finally, the effluent from the EDTA resin bed is passed to a second stage pH resin bed to adjust the discharge from the second pH resin bed.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
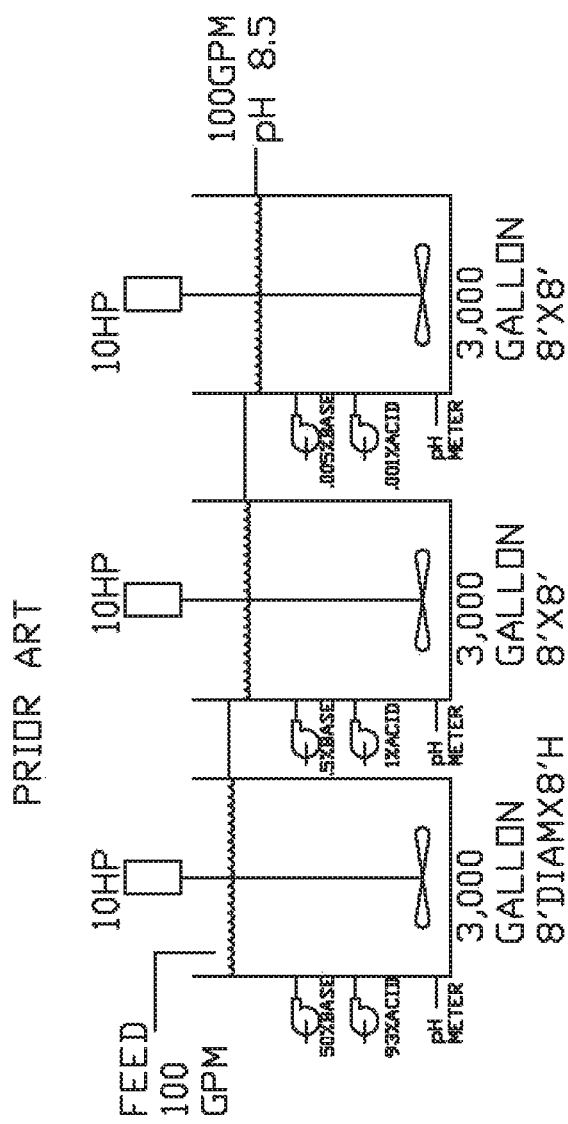
FIG. 1 is a simplified diagram of a prior art waste water treatment system.
Figure 2:
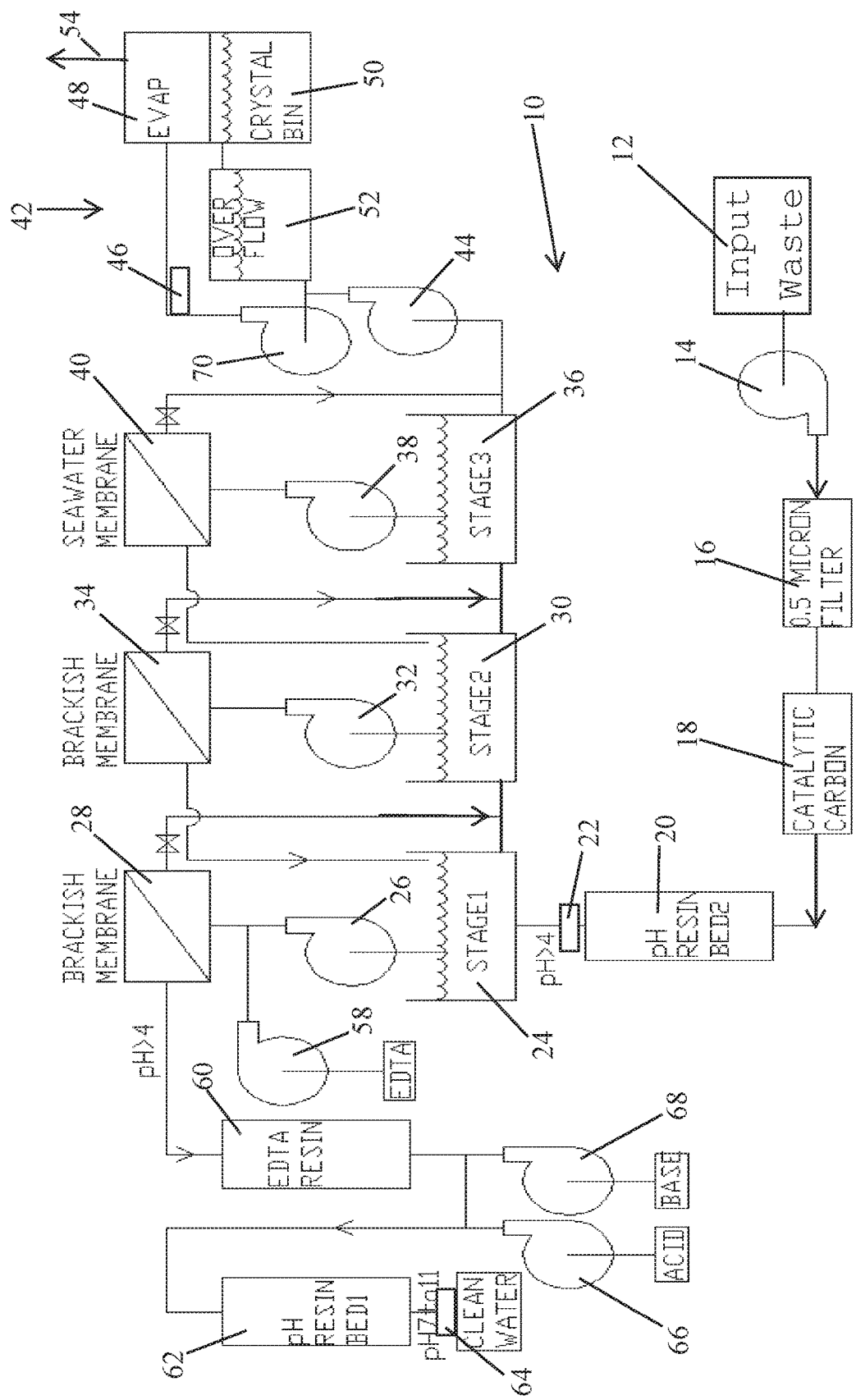
FIG. 2 is a diagram of a process to remove transition metals from waste water as set forth in the present invention.

Referring to the drawings in detail, FIG. 2 illustrates a simplified diagrammatic flow chart of the process to remove transition metals from waste water 10 as set forth in the present invention.

Initially, as shown at box 12, industrial waste water is input into the system, which may be accompanied by a pump 14. In one non-limiting example, 100 gpm of industrial waste water is input into the system.

The waste water is passed through an optional initial filter 16, such as a 0.5 micron filter, which removes suspended particles, such as solids, oils, and polymers. A pressure sensor (not shown) may be included to indicate level of fooling.

The filter 16 also protects downstream membranes (to be discussed) from fouling. Thereafter, the liquid is passed through an optional catalytic carbon or other reducing agents as shown at box 18, such as sodium bisulfate, to destroy chlorine, which may be harmful to the membranes (to be discussed) or resins (to be discussed).

The waste water is thereafter passed to a first pH resin bed 20. Selected weak acid or strong acid may be introduced to the first resin bed, as desired. The resin bed 20 may be a tank or vessel containing a large number of plastic beads. The pH of the liquid exiting the first resin bed 20 is monitored by a first pH monitor shown at box 22. Selected weak acid or strong acid is introduced to the first pH resin bed 20 to retain the effluent at pH greater than 4.

The metal ions may be released selectively by gradually reducing the pH. For example, the sodium may be released into the permeate as sodium chloride by reducing the pH with hydrochloric acid. Further, reduction in pH would release the nickel as nickel chloride. The excess acid in the nickel chloride is removed by passing the nickel chloride solution through weak base resin such as A133.

The weak base resin is periodically regenerated by rinsing with acid. The acid/nickel mixture is recycled by using it as acid source for the the EDTA, since both remove sodium from the EDTA. Hydrochloric acid is preferred because the chloride salts readily pass through the membrane.

The exhausted resin may be periodically removed from service, regenerated, and placed back in service.

Residence time in the first pH resin bed may be only 1 to 2 minutes.

The effluent from the first pH resin bed 20 is passed to a first stage liquid tank 24. Thereafter, the liquid in the first stage liquid tank 24 is passed, such as via a pump 26, to and through a first brackish water membrane 28.

Many metal complexes, such as those including EDTA and cyanide, are much larger than simple non-complexed metal salts. Therefore, they are filtered out with a brackish water membrane 28, while allowing simple salts, such as sodium chloride, to freely pass through the membrane. This yields very high rejection (over 99%) of transition metal complexes, while allowing non-complexed metals to pass.

EDTA may be added to the liquid stream prior to introduction to the first brackish water membrane 28, such as shown at pump 58.

In one example, a Filmtec NF 270 nanofiltration membrane is utilized. Complex metals, such as EDTA and cyanide, are filtered out by the first brackish water membrane 28.

Rejected effluent from the first brackish water membrane 28 is passed and directed to a second stage liquid tank 30.

Thereafter, the liquid in the second stage liquid tank 30 is directed, such as via pump 32, to a second brackish water membrane 34.

Permeate through the second brackish water membrane 34 is redirected back to the first stage liquid tank 24.

Rejected effluent from the second brackish water membrane may be directed to yet a further membrane, such as a seawater filter membrane 40. As seen in FIG. 2, the rejected effluent from the second brackish water membrane 34 is directed to a third stage liquid tank 36. The liquid in the third stage liquid tank is directed, such as via pump 38, to a seawater filter membrane 40. The permeate through the seawater membrane 40 is directed back to the second stage liquid tank 30.

A balancing system is also provided. In the event of overflow in the second stage tank 30, liquid may be re-directed to the first tank.

The rejected effluent from the seawater filter membrane 40 is thereafter directed to an evaporator system 42, such as via a pump 44. The effluent is heated by a heater, such as heat exchanger 46. Waste heat from the industrial process may be used as a heat source. The material is directed to an evaporator vessel 48. Clean water droplets or steam may be released, as shown by arrow 54. Meanwhile, a decanting tank 50 receives and retains crystals, such as crystals containing nickel.

In the event of overflow, an overflow tank 52 will retain the liquid, which may be recirculated to the evaporator 48 by pump 70.

Figure 3:
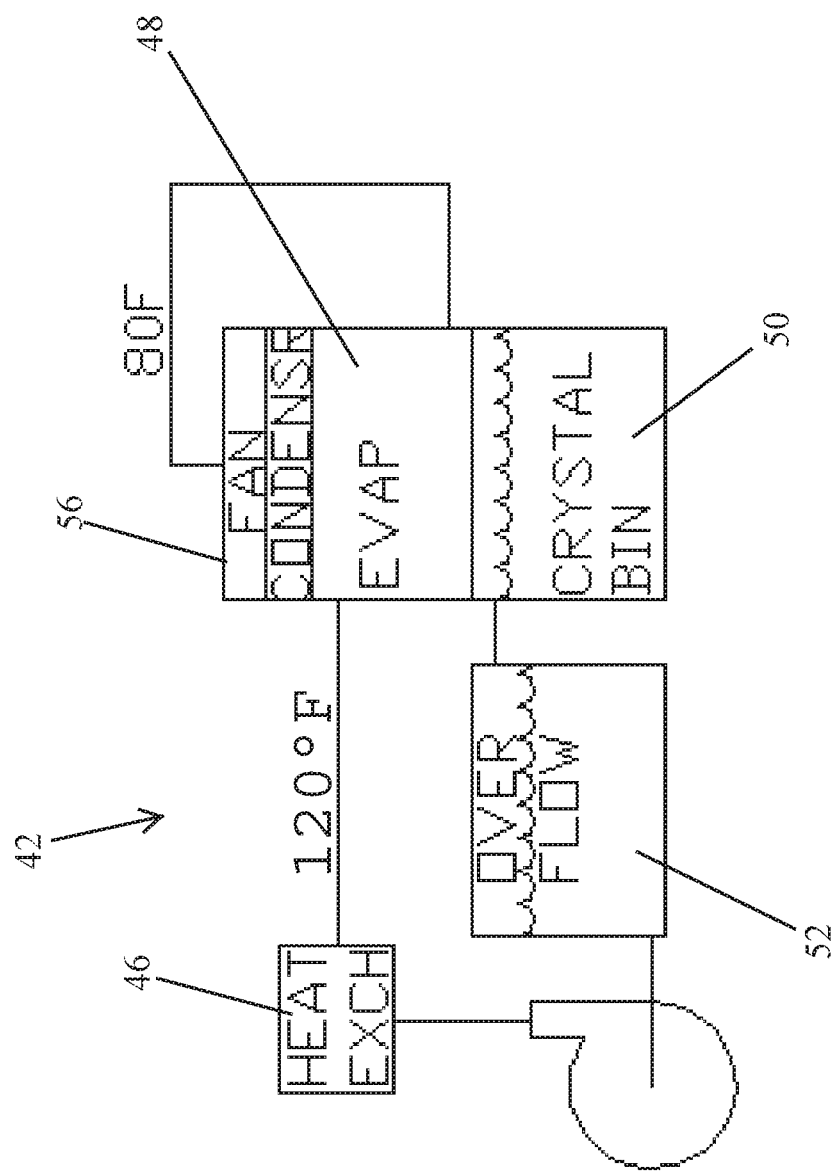
FIG. 3 is an alternate embodiment of the process to remove transition metals from waste water as set forth in FIG. 2.

FIG. 3 shows an alternate closed loop configuration for the evaporation system 42. A heat exchanger 46 heats the liquid material which is delivered into an evaporator vessel 48. In the closed loop system, a fan 56 is utilized to condense water droplets or steam. The condensate may be returned to the process water feed. A crystal bin 50 retains metal crystals. The closed loop system eliminates emissions to the atmosphere.

Returning to a consideration of FIG. 2, the permeate through the first brackish water membrane 28 will contain varying amounts of non-complexed transition metals, such as nickel and copper. The permeate is directed to a resin bed 60 or column containing a chelating resin, such as EDTA. In one example, the EDTA resin bed 60 will contain a micropo-rous polystyrene based chelating ion exchange resin. The addition of EDTA enhances removal of cations of heavy metals. One non-limiting example is Purolite 5930.

The EDTA is known to join onto non-complex metal ions that are remaining in the liquid effluent. Accordingly, transition metals are removed.

Thereafter, the effluent is directed to a second pH resin bed 62 to adjust the pH of the remaining water. A pH monitor 64 monitors the pH of water exiting the second pH resin bed 62. Either an acid or base material can be added to the pH resin bed to adjust the pH of the water to between 7 and 11, as shown at acid pump 66 and base pump 68. The effluent is monitored and controlled by a pH meter. Concentrated acid or base is added before the resin bed to maintain the desired pH (typically 7). Due to the large buffering capacity of the resin, tight pH control is achieved with a simple time duty base dosing system. Acid or base is added for a brief period followed by a pause period. This may be followed by a second pH control resin column system to insure tight and reliable pH control. The resin bed typically has a residence time of less than one minute. So, a 100 gpm neutralization system would require less than 100 gallons of resin. Influents containing large amounts of acid or base would require larger resin beds, since tight control obtained with a single stage system and pH over/under shoot is minimal at neutral pH neutralized.

In one example, a highly chelated waste stream containing nickel 10 ppm, copper, and zinc was untreatable by precipitation and most ion exchange resins. Those that worked had poor loading. The waste stream was also very high in sodium 1000 ppm.

A Filmtec NF 270 membrane concentrated the nickel 500 ppm, while the permeate had less than 0.1 ppm nickel, copper, and zinc and 400 ppm sodium. This was passed through an EDTA chelation resin Purolite 930S, which removed the zinc and copper to nondetect and the nickel to 0.06 ppm.

Whereas, the invention has been described in relation to the drawings attached hereto, it should be understood that other and further modifications, apart from those shown or suggested herein, may be made within the scope of this invention.

What is claimed is:

1. A process to control pH of an aqueous stream, which process comprises:
    adding an acid or base to an incoming waste water stream;
    thereafter passing said waste water stream after addition of said acid or base into and through at least one ion exchange resin in the form of plastic beads held in a bed;
    thereafter monitoring pH of effluent from said at least one ion exchange resin bed; and
    thereafter regulating said pH by adjusting the rates of the addition of said acid or base to said incoming waste water stream in response to said monitoring pH through a dosing system wherein acid or base is added for a period followed by a pause;
    passing effluent liquid from said ion exchange resin to a first stage liquid tank;
    passing said liquid from said first stage liquid tank through a brackish water membrane to filter out transition metal complexes; and
    passing permeate through said brackish water membrane to a resin bed containing macroporous polystyrene based chelating ion exchange resin.

2. The process to control pH as set forth in claim 1 including an additional preliminary step of passing said waste water stream through a filter to remove suspended particles.

3. The process to control pH as set forth in claim 1 including an additional preliminary step of passing said waste water stream through reducing agents to destroy chlorine.

4. The process to control pH as set forth in claim 1 including the additional step of passing effluent from said macroporous polystyrene based chelating ion exchange resin to a pH resin bed wherein an acid or base material is added.

5. A process to control pH of an aqueous stream, which process comprises:
    passing a waste water stream through a filter to remove suspended particles;
    thereafter passing permeate of said waste water stream through reducing agents to reduce chlorine;
    adding an acid or a base to said waste water stream;
    thereafter passing said waste water stream after addition of said acid or said base through an ion exchange resin in the form of plastic beads held in a bed;
    thereafter monitoring pH of effluent from said ion exchange resin; and
    regulating said pH by adjusting rates of the addition of said acid or base to said incoming waste water stream in response to said monitoring through a dosing system wherein acid or base is added for a period followed by a pause;
    passing effluent liquid from said ion exchange resin to a first stage liquid tank;
    passing said liquid from said first stage liquid tank through a brackish water membrane to filter out transition metal complexes; and
    passing permeate through said brackish water membrane to a resin bed containing microporous polystyrene based chelating ion exchange resin.

* * * * *